US011974126B2

United States Patent
Tabak et al.

(10) Patent No.: US 11,974,126 B2
(45) Date of Patent: Apr. 30, 2024

(54) METHOD, FIRST AND SECOND DEVICE AND SYSTEM FOR CONNECTING TO AT LEAST ONE CHIP

(71) Applicant: THALES DIS FRANCE SAS, Meudon (FR)

(72) Inventors: Danny Tabak, Gemenos (FR); Johan Josefsson, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 324 days.

(21) Appl. No.: 17/294,885

(22) PCT Filed: Nov. 19, 2019

(86) PCT No.: PCT/EP2019/081855
§ 371 (c)(1),
(2) Date: May 18, 2021

(87) PCT Pub. No.: WO2020/104487
PCT Pub. Date: May 28, 2020

(65) Prior Publication Data
US 2022/0014911 A1   Jan. 13, 2022

(30) Foreign Application Priority Data
Nov. 19, 2018   (EP) ..................... 18306515

(51) Int. Cl.
*H04W 64/00*   (2009.01)
*G06F 21/35*   (2013.01)
(Continued)

(52) U.S. Cl.
CPC ............ *H04W 12/06* (2013.01); *G06F 21/35* (2013.01); *G06F 21/44* (2013.01);
(Continued)

(58) Field of Classification Search
CPC ....... H04W 12/06; H04W 12/63; H04W 4/80; G06F 21/35; G06F 21/44; H04L 63/0492; H04L 63/0853
(Continued)

(56) References Cited

U.S. PATENT DOCUMENTS

| 8,745,754 B2 | 6/2014 | Bhaskar et al. | |
| 2013/0005402 A1* | 1/2013 | Bradley | H04W 4/60 455/558 |
| 2019/0327093 A1* | 10/2019 | Habraken | G06F 21/77 |

FOREIGN PATENT DOCUMENTS

| EP | 3331212 A1 | 6/2018 |
| WO | 2018099808 A1 | 6/2018 |

OTHER PUBLICATIONS

International Search Report (PCT/ISA/210) and Written Opinion (PCT/ISA/237) dated Dec. 10, 2019, by the European Patent Office as the International Searching Authority for International Application No. PCT/EP2019/081855.

* cited by examiner

*Primary Examiner* — Tanmay K Shah (57) ABSTRACT

A method comprises: Sending, by a first Chip Interface Device (CID), to a second CID, using a CID type protocol, a request for establishing a secure channel over a wireless protocol. Sending, by the second CID, to a Personal Computer Smart Card (PCSC), a first request for establishing a connection to the chip. Establishing, by the PCSC, a connection to the chip. Establishing, by the PCSC, a connection to the second CID. Establishing, by the second CID, a secure session with the first CID by using a session key. And sending, by the second CID, to the first CID, while using the CID type protocol, a secure CID channel establishment success that allows sending or receiving APDU(s) via the established secure channel over the wireless protocol. The (Continued)

second CID renders apparent to the first CID the chip as being connected.

9 Claims, 1 Drawing Sheet

(51) Int. Cl.
    *G06F 21/44* (2013.01)
    *H04L 9/40* (2022.01)
    *H04W 12/06* (2021.01)
    *H04W 12/40* (2021.01)
    *H04W 12/63* (2021.01)

(52) U.S. Cl.
    CPC ...... *H04L 63/0492* (2013.01); *H04L 63/0853* (2013.01); *H04W 12/63* (2021.01)

(58) Field of Classification Search
    USPC .......................................................... 455/411
    See application file for complete search history.

METHOD, FIRST AND SECOND DEVICE AND SYSTEM FOR CONNECTING TO AT LEAST ONE CHIP

FIELD OF THE INVENTION

The invention relates generally to a method for connecting to at least one chip.

Moreover, the invention also pertains to corresponding first device, second device and system for connecting to at least one chip.

The present invention is notably applicable to BluetooTH (or BTH) (registered Trademark), Bluetooth Low Energy (or BLE) (registered Trademark) or Wi-Fi (registered Trademark) enabled devices, as Short Range (or SR) Radio-Frequency (or RF) enabled devices, such as a first device, like e.g., a mobile (tele)phone, and a second device, like e.g., a Personal Computer (or PC), so as to access, through the chip, one or several services.

The chip may constitute a Secure Element (or SE).

The chip may cooperate with a third device, such as a Smart Badge Holder (or SBH) or a transparent reader. The chip may be embedded in or removable, such as a chip included within a Smart Card (or SC), a Universal Serial Bus (or USB) dongle or (hardware) token, from the third device.

Within the present description, an SE is a smart object including a chip(s) that protect(s), as a tamper resistant (hardware) component(s), access to stored and processed data and is intended to communicate data with one or several devices, such as a mobile phone, a PC, a tablet, a Machine to Machine (or M2M), an Internet of Things (or IoT) device, a server and/or the like, as a third device.

STATE OF THE ART

U.S. Pat. No. 8,745,754 B2 discloses a technique that uses a secure reader that has, on one hand, a Chip Card Interface Device (or CCID), as a standard smart card interface, to exchange with a smart card chip and, on another hand, an electrical industry standard interface, to exchange with a host computer. The host computer has access, through the secure reader, to a user authentication operation offered by the smart card chip. The host computer, as a unique device, uses the secure reader, as a standard CCID/Personal Computer Smart Card (or PCSC) compliant smart card reader, to access, through the standard CCID interface, the smart card chip.

US 20130005402 A1 describes a solution that uses a PC, as a first device, and a phone, as a second device, to access, from the PC, through the phone, via a PCSC, as a standard user smart card interface, a chip. The PC has access, via the standard user smart card interface, through the phone, as a chip host device, to the chip.

However, there is a need to access a chip, from a first device which does not have any standard user smart card interface, and prevents therefore a user from accessing a chip operation.

It is known to use a BLE technology to achieve a SC connection between a user PC, through e.g., a Gemalto/SafeNet (registered Trademark) Reader CT1100, as a SC reader and third device, and a mobile phone, while providing the phone and the SC reader with one or several Public Key Infrastructure (or PKI) functions. The SC connection is achieved via a so termed BTH Chip Card Interface Device (or BCCID) channel, as a proprietary communication channel, between the phone and the PC.

The BCCID supports two connection modes, namely, at a given time, either one connection to one Host termed Single Host (or SH) or, simultaneously, two or more connections to the Host termed Multi Host (or MH). The MH connection mode is based on a temporary disconnection by a (card) chip from the PC, a connection of the phone to the chip, a disconnection by the chip from the phone and then a re-connection of the PC to the chip.

However, such a disconnection/connection mechanism of the MH connection mode does not constitute a completely stable/robust connection mode mainly due to the BTH protocol.

WO 2018/099808 A1 describes a solution to such a problem. In one particular solution embodiment, a mobile phone, as a first Host device, connects to a BLE SC reader, as a second device, with a card chip. The phone delegates to a third device, like e.g., another phone, a session key that is previously shared with the BLE SC reader/card chip, as an authenticator. Then, the third device connects directly to the BLE SC reader/card chip by using the delegated session key, so as to authenticate, as a second Host device. The phone sends, to the third device, a command for disconnecting from the BLE SC reader/card chip. Thus, the phone controls the connection to/disconnection from the third device to the BLE SC reader/card chip for the MH connection mode.

There is a need to provide an alternative solution that allows having a stable/robust connection between the BLE SC reader and its host(s).

SUMMARY OF THE INVENTION

The invention proposes a solution for satisfying the just herein above specified need by supplying a method for connecting to at least one chip.

According to the invention, a first device including a first Chip Interface Device type interface or CID, a second device including a second CID, the second device including a Personal Computer/Smart Card type interface or PCSC, the method comprises the following steps.

a) sending, by the first CID, to the second CID, while using a CID type protocol, a request for establishing a secure CID channel over a wireless protocol, as a secure CID channel establishment request;

b) sending, by the second CID, to the PCSC, a first request for establishing a connection to the chip;

c) establishing, by the PCSC, a connection to the chip;

d) establishing, by the PCSC, a connection to the second CID, as a response to the first request;

e) establishing, by the second CID, a secure session with the first CID by using a session key; and f) sending, by the second CID, to the first CID, while using the CID type protocol, a message relating to a secure CID channel establishment success, as a response to the secure CID channel establishment request. The secure CID channel establishment success allows sending or receiving at least one Application Protocol Data Unit or APDU via the established secure CID channel over the wireless protocol. The second CID renders apparent to the first CID the chip as being connected. The second CID manages, through the PCSC, in a native manner, at least one connection to or at least one disconnection from the at least one chip.

The principle of the invention consists in that a first device supports a first CID (or the like), as a first interface, and a second device supports a second CID (or the like), as the first interface, and a PCSC (or the like), as a second interface. The first CID requests the second CID, by using a CID type protocol, to establish a secure channel over a wireless (communication) protocol. The PCSC establishes, firstly, upon a second CID request, a connection to a chip and establishes, secondly, a connection to the second CID. The second CID establishes a secure session with the first CID using a session key. The second CID transmits, through the CID type protocol, to the first CID, an authorization for establishing the secure channel over the wireless protocol, as a secure CID channel establishment success. The secure CID channel establishment success allows exchanging (i.e. sending and/or receiving) one or several Application Protocol Data Units (or APDU(s)) via the established secure CID channel over the wireless protocol. The second CID advertises thereby, before (or to) the first CID, the connection to the chip. The second CID manages, through a native PCSC layer, a connection(s) to/a disconnection(s) from the chip and possibly a connection to (an)other chip(s).

To establish the secure session with the first CID, the second CID determines (or generates) or retrieves the session key that is shared only with the first CID. The session key may have been generated separately and commonly by using a predetermined session key algorithm and data that is shared or to be shared only between the first and second CIDs. For each new session, a new session key is generated allows a secure (communication) session(s) between the second CID and the first CID.

The second device plays the role of a necessary chip interface from the first device or (an)other device(s) previously and/or subsequently connected to the second device, allowing to access the chip or another chip(s).

Thus, the second device can be used, as a wireless CID proxy, from an application(s) supported by the first device, in order to access, as (an)other PCSC interface(s) or application(s), one or several applications supported by and/or accessible through the chip.

It is noteworthy that the invention solution operates irrespective of the used technology for communicating between the second device and the chip. The used communication technology may include a USB type protocol, a Windows Virtual Desktop SC type technology (i.e. without any hardware component (namely a chip) but with a purely software component) or any other protocol/technology.

It is to be noted that, since the (second device) PCSC manages, in a native manner, the connection to/disconnection from the chip, the first device does not need to disconnect from the chip, so as to allow accessing the chip by (an)other device or (an)other application supported by the first device or the second device.

The invention solution allows avoiding to involve a user(s) or a first device to manage or control a connection/disconnection of one or several devices to/from the chip.

The invention solution may operate in both connection modes, namely in an SH connection mode and in a MH connection mode.

The invention solution is, based on an involvement of the second device, as a communication intermediary, to access a chip from outside.

The invention solution allows improving notably the stability/robustness of the wireless MH connection mode by avoiding to disconnect the connected first device, so as to release the connection to the chip.

The invention solution allows using a chip reader, as a possible third device, that does not need to be wireless and that is therefore cheaper to implement than a wireless chip reader, such as a dedicated BTH reader.

The invention solution allows easing a management, through the second device, as a wireless chip proxy, of the connection(s)/disconnection(s) to/from the chip.

According to a further aspect, the invention is a first device for connecting to at least one chip.

According to the invention, the first device including a first Chip Interface Device type interface or CID, the first CID is configured to:
  send, to a second CID, while using a CID type protocol, a request for establishing a secure CID channel over a wireless protocol; and
  receive, from the second CID, while using the CID type protocol, a message relating to a secure CID channel establishment success, as a response to the secure CID channel establishment request, the secure CID channel establishment success allowing to send or receive at least one APDU via the established secure channel over the wireless protocol, the chip being apparent, through the second CID, to the first CID, as being connected.

The first device may include a (user) terminal with or without a Man Machine Interface (or MMI), a mobile phone, a tablet, a portable device, such as a handheld computer, like e.g., a Personal Digital Assistant(s) (or PDA), a palm-top computer, a laptop, a desktop, a PC, a Voice Over Internet Protocol (or VOIP) handset, a netbook, a set-up box, a media player, a game console, a TeleVision (or TV) set, a machine of an M2M device, such as a vehicle computer(s), an IoT device(s) or any computing device.

According to a further aspect, the invention is a second device for connecting to at least one chip.

According to the invention, the second device including a second Chip Interface Device type interface or CID, the second device including a Personal Computer/Smart Card type interface or PCSC, the second CID is configured to:
  receive, from a first CID, while using a CID type protocol, a request for establishing a secure channel over a wireless protocol; and
  send, to the PCSC, a first request for establishing a connection to the chip;
  the PCSC is configured to:
  establish a connection to the chip; and
  establish a connection to the second CID, as a response to the first request;
  and the second CID is configured to:
  establish a secure session with the first CID by using a session key; and
  send, to the first CID, while using the CID type protocol, a message relating to a secure CID channel establishment success, as a response to the secure CID channel establishment request, the secure CID channel establishment success allowing to send or receive at least one Application Protocol Data Unit or APDU via the established secure channel over the wireless protocol, the second CID rendering apparent to the first CID the chip as being connected, the second CID managing, through the PCSC, in a native manner, at least one connection to or at least one disconnection from the at least one chip.

The second device may be a tablet, a portable device, such as a handheld computer, like e.g., a PDA, a palm-top computer, a laptop, a desktop, a PC or any computing device.

According to still a further aspect, the invention is a system for connecting to at least one chip. The system comprises a first device, a second device and the at least one chip.

According to the invention, the system is configured to carry out the aforementioned steps.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Herein under is considered a particular embodiment in which the invention method for connecting to a chip(s) is implemented by using a mobile phone, as a first device, a PC, as a second device, and a chip cooperating with a third device. The third device includes (or is coupled to) the chip, possibly incorporated in a removable manner, in a Printed Circuit Board (or PCB) of the third device. The chip may also incorporate at least part of the third device component(s), like e.g., a main processor, an application processor and/or other electronic component(s).

Alternately, the chip may include a Trusted Execution Environment (or TEE), as a secure area of a (computer) device processor and a secured runtime environment.

The chip is preferably included within an SE. The SE may nevertheless have different form factors.

Instead of being embedded within its cooperating device, the chip may be carried by a medium, such as a smart card or a dongle, like e.g., a USB type dongle or token, and is communicatively coupled or connected to its cooperating device.

The invention does not impose any constraint as to a kind of the SE.

As a removable SE, it may include a smart dongle of the USB type, a (micro) Secure Digital (or SD) type card, a Multi-Media type Card (or MMC), a Subscriber Identity Module (or SIM) type card or any format medium to be connected or coupled to the device that cooperates locally with the chip.

Alternatively, the SE includes the chip that is fixed to the device.

Naturally, the described embodiment is only for exemplifying purposes and is not considered to reduce the scope of the invention.

Figure 1:
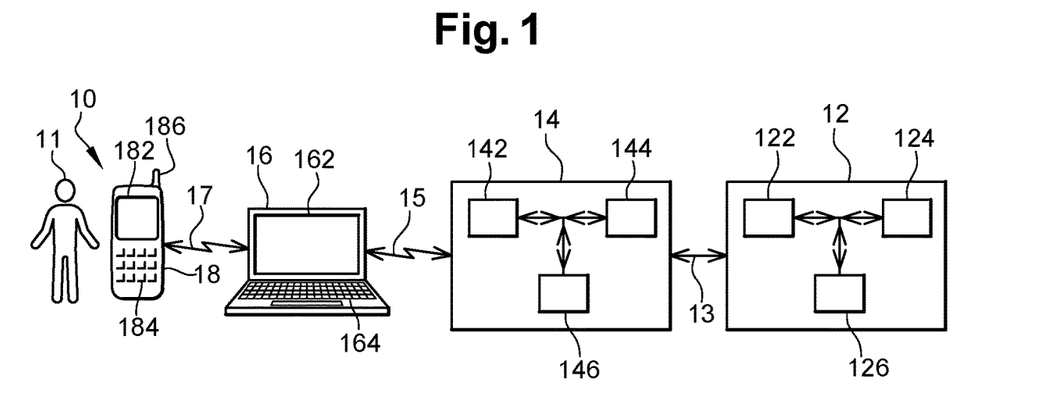
FIG. 1 illustrates a simplified diagram of one embodiment of a system with a (mobile) phone supporting a first CID, a PC supporting a second CID and a PCSC, that are configured so that the phone connects, through the native PCSC layer, to a chip, and the PC achieves, at the phone initiative, while using a CID type protocol, a secure channel establishment, over a wireless protocol, with the phone, according to the invention.

FIG. 1 shows schematically a system 10 for connecting to a chip(s) in a particular embodiment. The (chip connecting) system 10 comprises a chip 12, a (chip) reader 14, a PC 16, as an SR RF enabled device, and a (mobile) phone 18, as another SR RF enabled device.

The chip 12 comprises a (micro)processor(s) 122 (and/or a (micro)controller(s)), as data processing means, a memory(ies) 124, as data storing means, and one or several Input/Output (or I/O) interfaces 126 that are internally connected through a control and data bus 123.

The chip 12 is preferably coupled (or incorporated), over a first ContacT (or CT) or ContacT-Less (or CTL) link(s) 13, to e.g., a smart card, as a (chip) reader 14.

The chip 12 supports (or includes) notably an Operating System (or OS), one or several applications, such as a signature generation/verification application, a data encryption/decryption application and/or a device/chip identification/authentication application. The chip 12 offers thus one or several corresponding services.

The reader 14, as a device, includes or is coupled to the chip 12.

The reader 14 is for example a SBH, like e.g., a BLE smart card reader, such as a product termed Gemalto Reader CT1100, a transparent reader, a USB dongle or any other CT or CTL communicating device that cooperates with the chip 12.

The reader 14 may be equipped (or not) with an MMI or a limited MMI, like e.g., a led for indicating a power on, a led for indicating a pending (communication) session and/or a button to manage different modes (and without any display screen).

The reader 14 includes a (micro)processor(s) 142 (and/or a (micro)controller(s)), as data processing means, one or several memories 144, as data storing means, and one or several I/O interfaces 146.

The reader 14 may include e.g., an antenna(s) (not represented), that allow(s) communicating, over a second CTL link(s) 15, with an external device(s), like e.g., the PC 16.

Alternately, instead of using the second CTL link(s) 15, the reader 14 and the PC 16 exchange over a contact(s) or wire(s), i.e. in a CT manner.

The PC 16 includes a (micro)processor(s) (and/or a (micro)controller(s)), as data processing means (not represented), preferably a memory(ies), as data storing means (not represented), and one or several I/O interfaces (not represented).

The PC 16 may include (or be connected to) a display screen 162 and a keyboard 164, as an MMI allowing a user 11 (and/or (an)other user(s)) to interact with the PC 16.

The PC 16 supports (or includes) notably an Operating System (or OS), e.g., a BCCID module or interface, as a Chip Interface Device (or CID) type module or interface, and a Personal Computer/Smart Card (or PCSC) type application or interface.

As known per se, the PCSC interface is a specification for a SC integration into a computing environment(s), notably in a Microsoft (registered Trademark) Windows, a Linux (registered Trademark) or a Mac (registered Trademark) OS type environment.

As known per se, the PCSC interface allows using a communication protocol between a client and a server such that, if the client makes a predefined specific request to the server in a predefined specific format, then the server makes a predefined specific response in the format or a predefined action(s).

The PC 16 may support (or include) one or several applications, such as an email management application, like e.g., Outlook (registered Trademark), for cooperating with the chip 12, so as to decrypt or sign an email(s) to be sent with a private key stored in the chip 12 and/or used by the chip 12.

The PC 16 supports (or includes) a CID type driver, like e.g., Windows (registered Trademark) Chip Card Interface Device (or CCID) driver, that an application supported by the PC 16, such as the (PC) CID, has to use, through a native PCSC layer, to address the chip 12.

As known per se, a CCID type interface allows using a communication protocol that allows a chip to be connected or coupled to a computer, possibly via a card reader using a standard USB interface, without the need for each chip manufacturer to provide its own communication protocol. The CCID type interface allows the chip to be used as a hardware security token for a security or cryptographic function(s), such as a data signature, a data encryption and/or a data decryption.

The PC 16 stores (or lets store), in a PC memory or a memory included in a PC accessory or a secure chip (not represented), such as a Trusted Platform Module (or TPM), one or several keys that the PC 16 (or the chip cooperating with the PC 16) may retrieve to either derive or generate one or several session keys or use it (or them) as a session key(s).

The (or each) session key is used for communicating securely between the PC 16 and another interlocutor device, such as the phone 18, through their respective CID.

The (or each) session key is e.g., a random short term session key, as a temporary session key, or a permanent session key. The (or each) session key may be generated by using the predetermined session key generation algorithm and input data, like e.g., a Long Term Key (or LTK).

To generate a session key(s), the PC 16 (or the secure chip cooperating with the PC 16), and more exactly its CID, uses preferably a predetermined session key generation algorithm and input data, such as a master key that the PC 16 (or the secure chip cooperating with the PC 16) stores. The predetermined key session generation algorithm and the input data are shared with the phone 18, so as to generate separately and commonly the same session key(s).

The master key may have been previously used for pairing the PC 16 with another interlocutor device through a wireless protocol, like e.g., BTH or BLE.

The master key may be used to derive or generate a session key(s) to be used for establishing a secure channel over a wireless channel.

The PC 16, and more exactly its CID, (or the secure chip cooperating with the PC 16) stores preferably securely the session key(s) to be used for protecting data to be exchanged with an interlocutor device, such as the phone 18, through their respective CID.

The PC 16 incorporates (or is connected to) preferably an SR RF antenna(s) (not represented) that allow(s) communicating, over a wireless link(s) 17, with an external device(s), like e.g., the phone 18.

The PC 16 exchanges, over the wireless link(s) 17, with the interlocutor device by using one or several wireless communication protocols.

The wireless communication protocol(s) include(s) e.g., a BTH type protocol, a BLE type protocol, a Near Field Communication (or NFC) type protocol, a Zigbee type protocol and/or a Wi-Fi type protocol. The wireless communication protocol(s) may include any other wireless communication protocol supported by both the PC 16 and the interlocutor device.

To establish a secure channel with a possible interlocutor device that also includes a CID, the (PC) CID either generates or retrieves a session key(s) to be used to encipher data to be sent to and/or decipher data to be received from the interlocutor device CID respectively.

The PC 16 PCSC is able to connect, via a possible device, such as the reader 14, through a CT or CTL link(s) 15, to the chip 12.

The PC 16 is configured to act, as a wireless CID proxy, to advertise the reader 14 that cooperates with the chip 12, so as to address the chip 12 from (an)other device(s), like e.g., the phone 18, that initiates preferably an establishment of a secure channel with the PC 16, via their respective CID, over a wireless protocol.

The phone 18 includes (and/or is connected to) a battery(ies).

The phone 18 comprises a (micro)processor(s) (and/or a (micro)controller(s)), as data processing means (not represented), preferably a memory(ies), as data storing means (not represented), and one or several I/O interfaces (not represented).

The phone 18 may include (or be connected to) a display screen 182 and a keyboard 184, as an MMI allowing the user 11 to interact with the phone 18.

The phone 18 may include a Long Range (or LR) RF antenna 186 that allows communicating, in an LR RF manner, with a mobile communication network(s) (not represented).

The phone 18 incorporates (or is connected to) an SR RF antenna(s) (not represented) that allow(s) communicating, e.g., through a wireless link(s) 17, i.e. in a CTL manner, with an external device(s), like e.g., the PC 16.

The phone 18 supports (or includes) notably an OS, a CID module or interface and one or several applications for cooperating with the chip 12, as a chip cooperation application(s).

The chip cooperation application(s) may include a mobile application(s) and/or a Software Development Kit (or SDK), like e.g., a so termed Gemalto IDGo 800, as a cryptographic middleware suite.

The (phone 18) CID, as a first (device) CID, is configured to request e.g., a (PC 16) CID, as a second (device) CID, while using e.g., a BCCID type protocol, as a CID type protocol, to establish a secure channel over a wireless (communication) protocol, such as BTH or BLE.

To establish a secure channel with a possible interlocutor device that also includes a CID, the (phone) CID either generates or retrieves a session key(s) to be used to encipher data to be sent to and/or decipher data to be received from the interlocutor device CID respectively.

The phone 18 stores (or lets store), in a phone memory or a memory included in a coupled or incorporated chip (not represented), such as a Subscriber Identity Module (or SIM) type card or an embedded SE, one or several keys that the phone 18 (or the chip cooperating with the phone 18) may retrieve to either generate one or several session keys or use it (or them) as a session key(s).

The (or each) session key is used for communicating securely between the phone 18 and another device, such as the PC 16, through their respective CID.

To generate a session key(s), the phone 18 (or the chip cooperating with the phone 18) uses preferably a predetermined session key generation algorithm and input data, such as a master key that the phone 18 (or the chip cooperating with the phone 18) stores. The predetermined key session generation algorithm and the input data are shared with the interlocutor device, such as the PC 16, so as to generate separately and commonly the same session key(s).

The phone 18 or (an)other device(s) or a chip(s) cooperating with the phone 18 store(s) the session key(s).

The established secure session uses the session key(s) to exchange securely data between the first CID and the second CID.

The established secure session between the first and second CIDs allows getting or establishing a secure channel over a wireless protocol.

Once the phone 18 has established the secure channel over the wireless protocol with the PC 16, as an interlocutor device, that has also established a connection to the chip 12, the phone 18 may exchange with the chip 12, so as to access a service(s) that is provided by or through the chip 12.

Such an exchange between a mobile application supported by the phone 18 and the chip 12 may be further secured, so as to protect data exchanged between each other.

Figure 2:
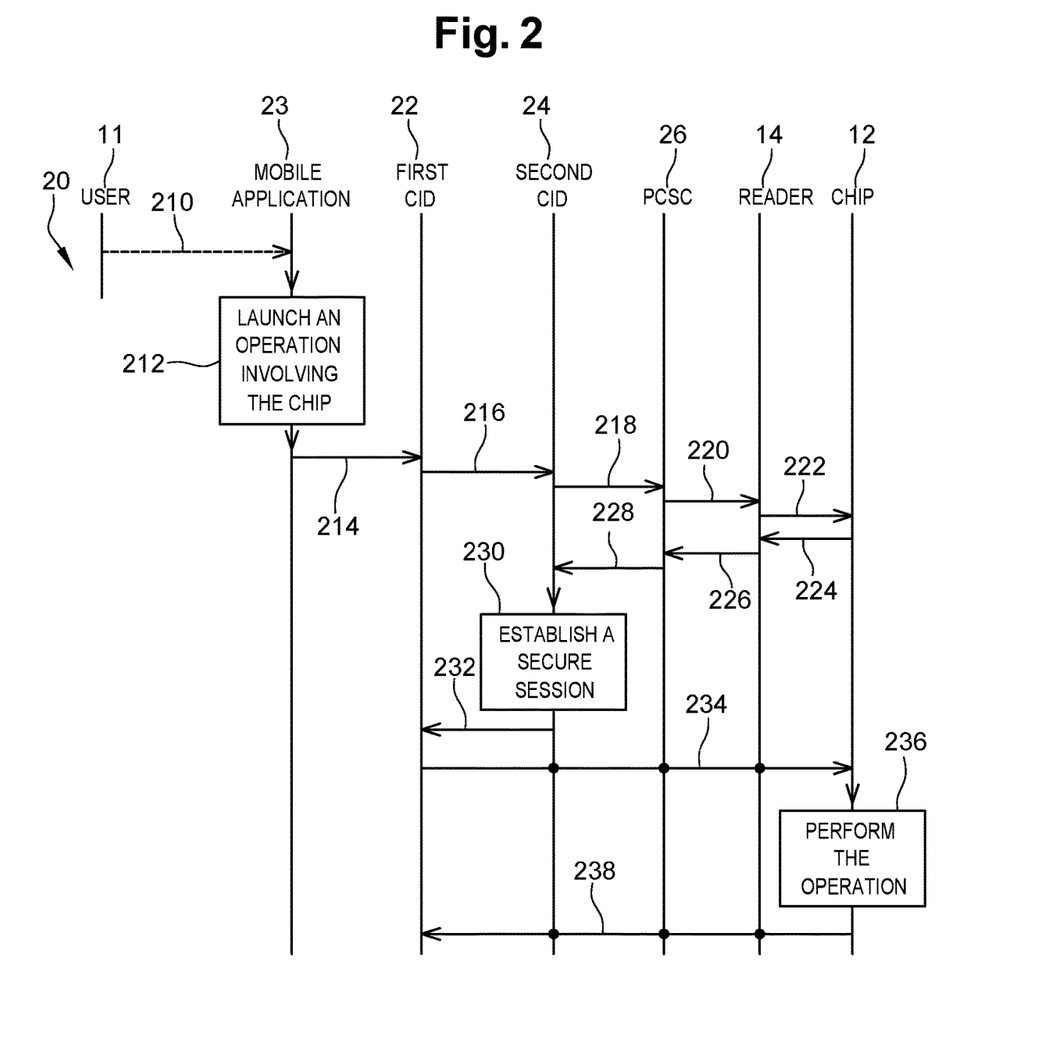
FIG. 2 represents an embodiment of a message flow between notably the first CID, the second CID, the PCSC and the chip of FIG. 1, in which the first CID requests the second CID to establish a secure channel over the wireless protocol, the PCSC connects, based on the second CID request, to the chip and to the second CID, the second CID determines a session key shared only between the first and second CIDs, and the second CID sends, by using the CID type protocol, to the first CID, an approval for establishing the secure channel over the wireless protocol.

FIG. 2 depicts an exemplary embodiment of a message flow 20 that involves notably the user 11, the phone 18, as a first device, the PC 16, as a second device, the reader 14, as a third device, and the chip 12, so as to let the phone 18 and the chip 12 interact with each other through the PC 16, as a wireless CID proxy.

It is assumed that the phone 18 supports, besides a first CID 22, a Mobile Application or MA 23, as a chip cooperation application, that has to cooperate with the chip 12, so that the chip 12 performs an operation(s), such as a PKI operation(s).

The PC 16 supports a second CID 24 and a PCSC 26.

The PC 16 may support a PC application (not represented) that has to cooperate with the chip 12, so as to perform an operation(s).

It is further assumed that the phone 18 is in a range that is sufficiently close to the PC 16 to communicate individually, in a wireless manner, with the PC 16.

Optionally, the user 11 uses the phone 18 MMI to detect the PC 16 and pair to the PC 16.

The first CID 22 preferably pairs with the second CID 24 (not represented) by establishing an LTK. The LTK is shared only between the first CID 22 and the second CID 24. The LTK allows the first CID 22 and the second CID 24 to exchange securely data while using a wireless protocol, like e.g., BTH or BLE.

According to a particular embodiment, the user 11 requests, through an interaction message 210 with the phone MMI, the MA 23 to perform an operation(s), such as a PKI operation(s).

Alternately, the phone 18 automatically requests the MA 23 to perform an operation(s), such as a PKI operation(s).

The phone 18 executes the MA 23.

The user 11 may submit or enter, through an MMI that is included in or coupled to the phone 18, a Personal Identity Number (or PIN) and/or other user authentication data (not represented). The PIN and/or the authentication data is then sent, through the mobile application 22, to the chip 12 (as further described), so as to authenticate the user and indicate thus her/his consent to authorize the chip 12 to perform an operation(s) launched from the phone 18.

The MA 23 launches 212, during its execution by the phone 18, an operation(s), such as a PKI operation(s), like e.g., a data signature, that involves the chip 12.

The MA 23 sends, to the first CID 22, a request 214 for connecting to the PC 16.

After having received the PC connection request, the first CID 22 sends, to the second CID 24, while using e.g., a BCCID type protocol, as a wireless CID type protocol, a request 216 for establishing a secure channel over e.g., a BTH or BLE type protocol, as a wireless protocol.

After having received the secure channel establishment request, the second CID 24 sends, to the PCSC 26, a first request 218 for establishing a connection to the chip 12.

Once the PCSC 26 has received the first chip connection establishment request 218, the PCSC 26 establishes a connection directly or indirectly (i.e. through e.g., a device, such as the reader 14, cooperating with the chip 12) to the chip 12.

To establish a connection to the chip 12, when the chip 12 cooperates with the reader 14 (or another cooperating device), the PCSC 26 sends, based on the first chip connection establishment request 218, to the reader 14, a second request 220 for establishing a connection to the chip 12. The reader 14 sends, based on the second chip connection establishment request 220, to the chip 12, a third request 222 for establishing a connection to the chip 12. The chip 12 establishes a third connection to the reader 14 by sending, to the reader 14, a message 224 relating to a third connection success with the reader 14, as a response to the third chip connection establishment request 222. The reader 14 establishes a second connection to the PCSC 26 by sending, to the PCSC 26, a message 226 relating to a second connection success with the PCSC 26, as a response to the second chip connection establishment request 220.

The PCSC 26 establishes a first connection to the second CID 24 by sending, to the second CID 24, preferably a message 228 relating to a second connection success with the second CID 24, as a response to the first chip connection establishment request 218.

According to another embodiment (not represented), once the second CID 24 has established a secure session with the first CID 22, the PCSC 26 establishes a connection to the chip 12.

According to a preferred embodiment, once the PCSC 26 has established preferably the connection to the chip 12, the second CID 24 establishes 230 a secure session with the first CID 22 by using a session key. Such a preferred embodiment allows an establishment of a secure session between the second CID 24 and the first CID 22 only if the PCSC 26 has previously established the connection to the chip 12.

Then (i.e. once the second CID 24 has established the secure session with the first CID 22), the second CID 24 sends, to the first CID 22, while using e.g., the BCCID protocol, a message 232 relating to a secure CID channel establishment success. The secure CID channel establishment success allows sending and/or receiving one or several APDUs via the established secure CID channel over e.g. BTH or BTE, as a response to the secure channel establishment request 216.

The first CID 22 and the second CID 24 generate preferably both the session key by using an on-the-fly generated session key seed and the LTK, as a predetermined (i.e. previously stored) LTK that is shared between the first CID 22 and the second CID 24.

According to a first alternative, the first CID 22 and the second CID 24 determine or generate both the session key by using either an on-the-fly generated session key or an on-the-fly generated session key seed. The first CID 22 has securely, e.g., by using a public key relating to the second CID 24, sent, along with the secure CID channel establishment request, either the session key or the session key seed.

According to a second alternative, the first CID 22 and the second CID 24 generate both the session key by using a Diffie-Hellman based session key establishment. The Diffie-Hellman algorithm provides, as a corresponding result, the session key that is a secret key shared between the first CID 22 and the second CID 24.

Thus, the second CID 24 renders apparent to the first CID 22 the chip 12 as being connected.

Once the secure CID channel is established between the second CID 24 and the first CID 22, the first CID 22 sends, to the MA 23, a connection success 233 from the MA 23 to the PC 16, as a response to the PC connection request 214. The connection success 233 from the MA 23 to the PC 16 means that the MA 23 is now able to communicate with the chip 12 to thereby access one or several services offered by the chip 12.

The phone 18 is connected, through the PC 16, as a wireless CID proxy, via a PCSC Application Programming Interface (or API), as a PCSC type interface, to the chip 12.

The second CID 24 carries out a process that takes, as input, a CID wireless request, like e.g., a request for establishing a secure CID channel, to transform the CID wireless request into a PCSC API request(s), like e.g., a SCardConnect that is possibly preceded by a SCardEstablishContext and that is possibly followed by a SCardBeginTransaction.

The SCardConnect means that the second CID 24 and the PCSC API establishes a connection between the second CID 24 and the PCSC API.

The SCardEstablishContext means that the PCSC API is now available to the second CID 24.

The SCardBeginTransaction means that the PCSC API has locked for the second CID 24 a specific channel.

The second CID 24 manages, through the PCSC 26, in a native manner, a connection(s) to or a disconnection(s) from the chip 12 and possibly (an)other chip(s) (not represented).

Once connected, through the PC 16, as an intermediary, to the chip 12, the phone 18 (and more exactly the first CID 22) does not need to disconnect from the chip 12 (and more exactly the second CID 24) and remains connected, so as to allow another application, such as an application supported by the PC 16, to connect to the chip 12. The described invention solution is applicable in both the SH mode and the MH mode. Once connected, through the PC 16, as an intermediary, to the chip 12, the phone 18 may disconnect, under phone 18 request, from the chip 12.

The established secure session allows using the session key(s) to encipher data to be sent by one of the first 22 and second 24 CIDs to the other of the first 22 and second 24 CIDs.

The established secure session allows using the session key(s) to decipher data to be received by one of the first 22 and second 24 CIDs from the other of the first and second CIDs.

The MA 23 sends, through the first CID 22, the second CID 24, the PCSC 26 and the reader 14, to the chip 12 a command message 234 including a command possibly along with data, like e.g., SelectApplet. Such a command message may include a request for performing an operation(s), as a command.

The command message 234 includes one or several APDUs.

The command message 234, such as "verify PIN" or "sign <data>", as an APDU command message, may be used e.g. for verifying user authentication data or signing data along with the user authentication data to be verified or the data to be signed respectively.

Optionally, prior to sending the command message 234, the MA 23, as a chip cooperation application, enciphers data to be sent to the chip 12. The chip 12 deciphers the received enciphered data, so as to get data in plain text.

Once the chip 12 has received data, the chip 12 performs 236 (or carries out), after a possible decipherment of the received data, based on the received data (in plain text), the (requested) operation(s), such as a verification of user authentication data. For example, the chip 12 verifies whether the (received) user authentication data does or does not match reference user authentication data that is stored securely in the chip 12 memory. If the user authentication data matches the reference user authentication data, then the chip 12 authenticates the concerned user 11 and authorizes to continue an execution of an application supported by the chip 12. Otherwise, i.e. if the user authentication data does not match the reference user authentication data, the chip 12 does not authenticate the concerned user 11 and forbids to continue an execution of an application supported by the chip 12. The chip 12 issues e.g. a success or failure result, such as "OK" or "KO", as a command response, respectively.

Once the chip 12 has carried out the operation(s), the chip 12 sends, through the reader 14, the PCSC 26, the second CID 24 and the first CID 22, to the MA 23, a result message 238, as a response to the command message 234. The result message 238 includes a command response possibly along with operation result data, such as a digital signature.

The command response includes one or several APDUs, as command response.

Optionally, prior to sending the response message 238, the chip 12 enciphers data to be sent to the MA 23. The MA 23 deciphers the received enciphered data, so as to get data in plain text.

Instead of disconnecting from the chip 12, the phone 18, as a first host device, remains connected to the chip 12, when the chip 12 is able to connect to several host devices in parallel (in a MH scenario).

Thus, a synchronization between the MA 23 and a chip function/operation, is natively resolved via the PCSC layer.

Once the phone 18 has received the corresponding response message 238, the MA 23 may send, through the first CID 22, the second CID 24, the PCSC 26 and the reader 14, to the chip 12, another command message (not represented) including another command possibly along with data.

Such another command message may include a request for performing another operation(s) or a request for disconnecting to the chip, as another command.

The MA 23 sends, to the first CID 22, a request (not represented) for disconnecting from the PC 16.

The first CID 22 sends, to the second CID 24, while using the wireless CID type protocol, a request (not represented) for releasing the secure channel over the wireless protocol.

The second CID 24 sends, to the PCSC 26, a first request for disconnecting from the chip 12.

The second CID 24 carries out a process that takes, as input, a CID wireless request, like e.g., a request for releasing the secure CID channel, to transform the CID wireless request into a PCSC API request(s), like e.g., a SCardDisonnect that is possibly preceded by a SCardEndTransaction and that is possibly followed by a SCardReleaseContext.

The SCardDisconnect means that the second CID 24 and the PCSC API releases the connection between the second CID 24 and the PCSC API.

The SCardReleaseContext means that the PCSC API is no longer available to the second CID 24.

The SCardEndTransaction means that the PCSC API has unlocked for the second CID 24 the open channel.

Once the PCSC 26 has received the first chip disconnection request, the PCSC 26 releases the connection directly or indirectly (i.e. through e.g., the device, such as the reader 14, cooperating with the chip 12) to the chip 12.

To release the connection to the chip 12, when the chip 12 cooperates with the reader 14 (or another cooperating device), the PCSC 26 sends, based on the first chip disconnection request, to the reader 14, a second request for disconnecting from the chip 12. The reader 14 sends, based on the second chip disconnection request, to the chip 12, a third request for disconnecting from the chip 12. The chip 12 releases the third connection to the reader 14, as a response to the third chip disconnection request. The reader 14 releases the second connection to the PCSC 26, as a response to the second chip disconnection request.

The PCSC 26 releases the first connection to the second CID 24, as a response to the first chip disconnection request.

According to a preferred embodiment (not represented), once the PCSC 26 has released the connection to the chip 12, the second CID 24 closes the secure session with the first CID 22.

Once the second CID 24 has closed the secure session, the second CID 24 sends, to the first CID 22, while using e.g., the BCCID protocol, a message relating to a secure CID channel release success.

Once the secure CID channel is released between the second CID 24 and the first CID 22, the first CID 22 sends, to the MA 23, a disconnection success from the MA 23 to the PC 16, as a response to the PC disconnection request. The disconnection success from the MA 23 to the PC 16 means that the MA 23 is no longer able to communicate with the chip 12.

The invention solution uses a second device, through a native PCSC layer, to have a full control of simultaneous and/or consecutive connections to and disconnections from the chip from a (chip) host device(s).

The invention solution allows getting, through a second device, as a wireless CID proxy, a stable/robust MH operation mode to connect to a chip.

The invention solution is independent from the communication protocol/technology used between the second device and the chip.

The invention solution is compatible with existing wireless enabled devices, as first and second devices, and chip (or software component).

The invention solution allows thus to connect to a chip, by using a simple and cheap solution, based on wireless enabled first and second devices, such as a BLE phone and a BLE PC, a possible reader and a token, such as a USB token, while remaining stable/robust in a MH operation mode.

Such a use of the second device, as a wireless CID proxy, allows easing a management of connections to/disconnections from the chip while remaining secure.

The embodiment that has just been described is not intended to limit the scope of the concerned invention. Other embodiments may be given. As another embodiment example, instead of being in a SH operation mode with the chip, the second device manages, in a MH operation mode with the chip, a connection(s) to the chip from one or several other chip hosts that are distinct from the mobile application, such as (an)other first device(s) (not represented), an application(s) (not represented) supported by the second device and/or (an)other mobile application(s) supported by the first device (not represented).

The invention claimed is:

1. A method for connecting to at least one chip,
   via a first device including a first Chip Interface Device type interface (CID), and a second device including a second CID, the second device including a Personal Computer/Smart Card (PCSC) type interface, wherein the method comprises the following steps:
   a) sending, by the first CID, to the second CID, while using a CID type protocol, a request for establishing a secure CID channel over a wireless protocol, as a secure CID channel establishment request;
   b) sending, by the second CID, to the PCSC, a first request for establishing a connection to the chip;
   c) establishing, by the PCSC, a connection to the chip;
   d) establishing, by the PCSC, a connection to the second CID, as a response to the first request;
   e) establishing, by the second CID, a secure session with the first CID by using a session key; and
   f) sending, by the second CID, to the first CID, while using the CID type protocol, a message relating to a secure CID channel establishment success, as a response to the secure CID channel establishment request, the secure CID channel establishment success allowing to send or receive at least one Application Protocol Data Unit or APDU via the established secure CID channel over the wireless protocol, the second CID rendering apparent to the first CID the chip as being connected, the second CID managing, through the PCSC, in a native manner, at least one connection to or at least one disconnection from the at least one chip.

2. Method according to claim 1, wherein the first CID and the second CID generate both the session key, by using an on-the-fly generated session key seed and a predetermined long term key shared between the first CID and the second CID.

3. Method according to claim 1, wherein the first CID and the second CID determine or generate both the session key by using either an on-the-fly generated session key or an on-the-fly generated session key seed, the first CID having securely sent, along with the secure CID channel establishment request, either the session key or the session key seed.

4. Method according to claim 1, wherein the first CID and the second CID generate both the session key by using a Diffie-Hellman based session key establishment, the session key being a shared secret key.

5. Method according to claim 1, wherein, prior to step a), the method further comprises a step in which the first CID pairs with the second CID by establishing a long term key, the long term key being previously shared only between the first CID and the second CID.

6. Method according to claim 1, wherein, the first device including an application for cooperating with the chip, the method further comprises, prior to step a):
   a chip cooperation application launches, during a chip cooperation application execution, by the first device, at least one operation; and
   the chip cooperation application sends, to the first CID, a request for connecting to the second device; and
   after step f), the first CID sends, to the chip cooperation application, a message relating to a connection success with the second device, as a response to the second device connection request.

7. Method according to claim 1, wherein, the chip cooperates with a third device, to carry out step c), and the method includes the following steps:
   sending, based on the first chip connection establishment request, by the PCSC, to the third device, a second request for establishing a connection to the chip;
   sending, based on the second chip connection establishment request, by the third device, to the chip, a third request for establishing a connection to the chip;

sending, by the chip, to the third device, a message relating to a third connection success with the third device; and sending, by the third device, to the PCSC, a message relating to a second connection success with the PCSC.

8. A second device for connecting to at least one chip, wherein the second device includes a second Chip Interface Device type interface (CID), the second device including a Personal Computer/Smart Card type interface (PCSC), the second CID is configured to:

receive, from a first CID, while using a CID type protocol, a request for establishing a secure channel over a wireless protocol; and send, to the PCSC, a first request for establishing a connection to the chip;

wherein the PCSC is configured to:
  establish a connection to the chip; and
  establish a connection to the second CID, as a response to the first request;

and wherein the second CID is configured to:

establish a secure session with the first CID by using a session key; and send, to the first CID, while using the CID type protocol, a message relating to a secure CID channel establishment success, as a response to the secure CID channel establishment request, the secure CID channel establishment success allowing to send or receive at least one Application Protocol Data Unit or APDU via the established secure channel over the wireless protocol, the second CID rendering apparent to the first CID the chip as being connected, the second CID managing, through the PCSC, in a native manner, at least one connection to or at least one disconnection from the at least one chip.

9. A system for connecting to at least one chip, the system comprising a first device, a second device and the at least one chip, wherein the system is configured to carry out the steps of claim 1.

\* \* \* \* \*